(12) United States Patent
Kaschak et al.

(10) Patent No.: US 7,105,108 B2
(45) Date of Patent: *Sep. 12, 2006

(54) GRAPHITE INTERCALATION AND EXFOLIATION PROCESS

(75) Inventors: David M. Kaschak, Olmsted Falls, OH (US); Robert A. Reynolds, III, Bay Village, OH (US); Daniel W. Krassowski, Columbia Station, OH (US); Brian M. Ford, Grayslake, IL (US)

(73) Assignee: Advanced Energy Technology Inc., Wilmington, DE (US)

( * ) Notice: Subject to any disclaimer, the term of this patent is extended or adjusted under 35 U.S.C. 154(b) by 573 days.

This patent is subject to a terminal disclaimer.

(21) Appl. No.: 10/219,176

(22) Filed: Aug. 15, 2002

(65) Prior Publication Data

US 2004/0033189 A1    Feb. 19, 2004

(51) Int. Cl.
*C01B 31/04*    (2006.01)
(52) U.S. Cl. ..................... 252/378 R; 423/448; 264/42
(58) Field of Classification Search ................ 423/448; 252/378 R; 264/42, 105, 343, 344
See application file for complete search history.

(56) References Cited

U.S. PATENT DOCUMENTS

| | | | |
|---|---|---|---|
| 3,404,061 A | 10/1968 | Shane et al. | 161/125 |
| 4,895,713 A | 1/1990 | Greinke et al. | 423/448 |
| 6,239,067 B1 | 5/2001 | Palacios | 502/432 |
| 6,287,694 B1 | 9/2001 | Zaleski et al. | 428/402 |
| 6,757,154 B1 | 12/2001 | Reynolds et al. | |
| 6,384,094 B1 | 5/2002 | Gluck | 521/56 |
| 6,406,612 B1 | 6/2002 | Greinke | 205/555 |
| 2002/0054995 A1 | 5/2002 | Mazurkiewicz | |

OTHER PUBLICATIONS

Behrens, P. et al., 'Synthesis and Characterization of the Graphite Intercalation Compounds of Bismuth Trichloride' in CARBON vol. 26 No. 5 pp. 641-646, 1988, full copy consulted.
U.S. Appl. No. 10/022,596; filed Dec. 13, 2001; Reynolds et al. now U.S. Patent 6757154.
"Chips off a new block", *The McKinsey Quarterly*, 2002 Number 1, Grant et al. (2002) (4 pages).

*Primary Examiner*—Stuart Hendrickson
(74) *Attorney, Agent, or Firm*—Waddey & Patterson; James R. Cartiglia

(57) ABSTRACT

The invention relates to expanded graphite and methods of making the graphite and products that can be made from the graphite made from the inventive process. The invention includes the step of introducing a fluid into at least one of a plurality of interstices of graphite flake, wherein the fluid comprises at least one of a sub-critical point fluid, a near critical point fluid, or a supercritical fluid. The graphite flake is also intercalated with an intercalant and optionally an oxidizing agent. The invention may further include novel techniques of exfoliating the graphite. The invention may be practiced to make nano-sized graphite particles and also graphite composites. Preferred composites which may be made in accordance with the invention include conductive polymeric composites (thermally or electrically), paint composites, battery composites, capacitor composites, and pollution abatement catalyst support composites.

29 Claims, 2 Drawing Sheets

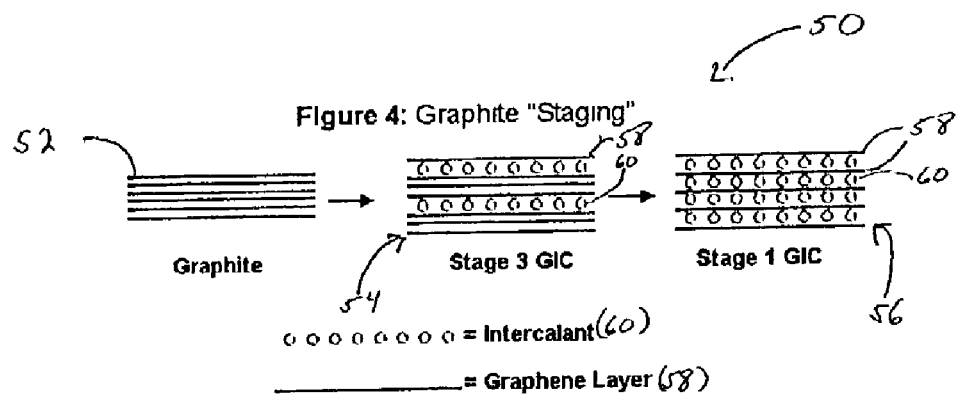
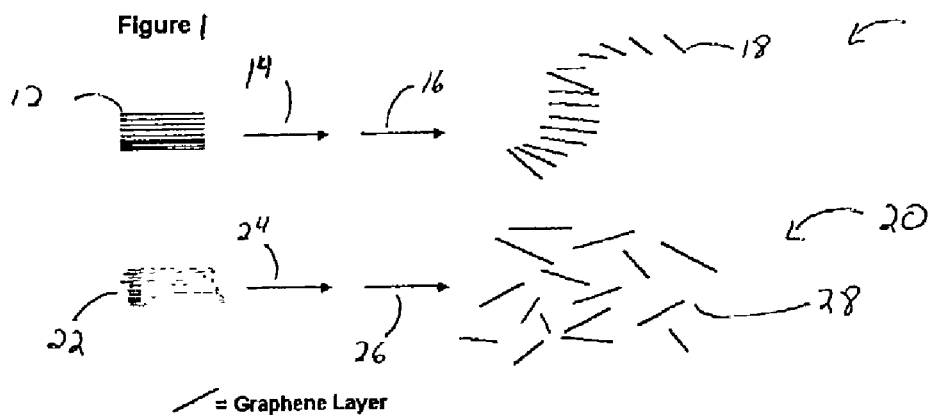
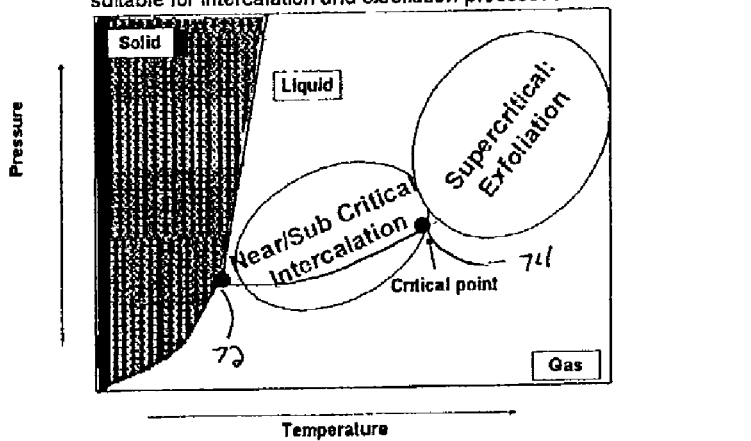

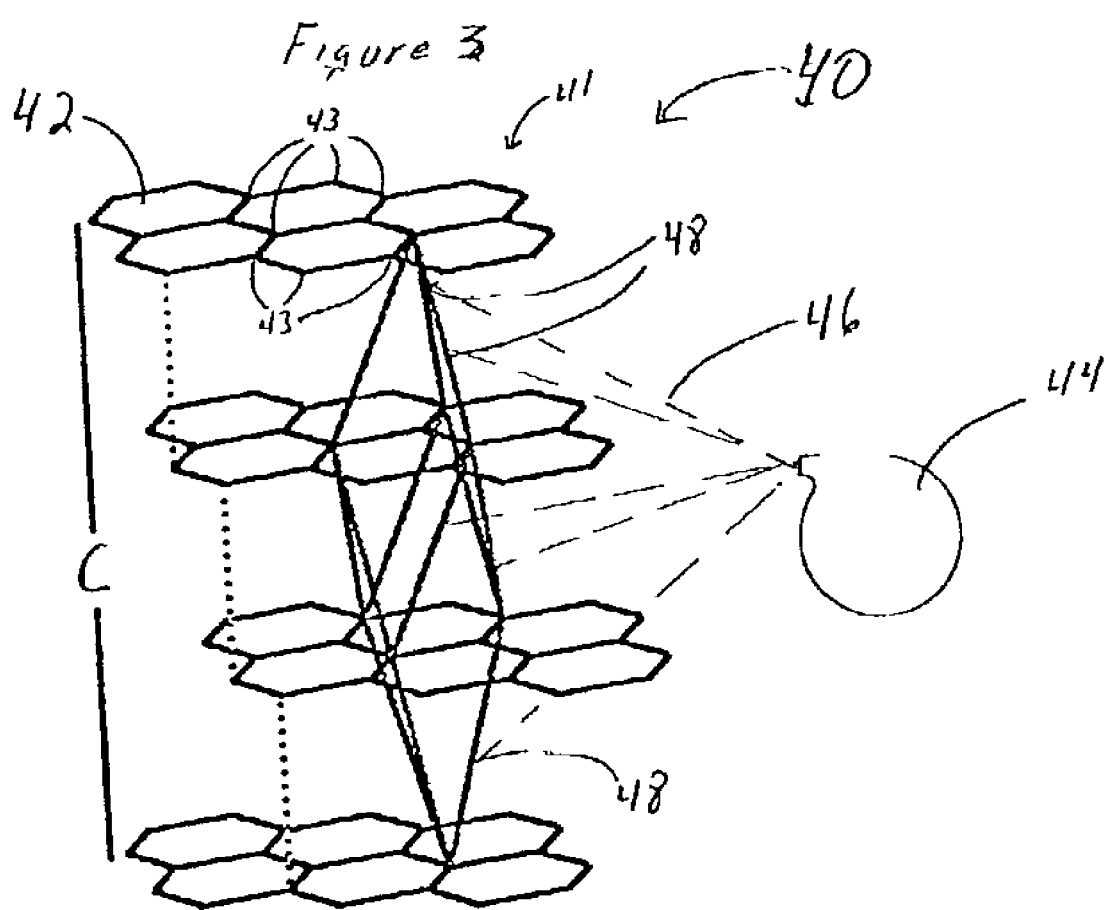

GRAPHITE INTERCALATION AND EXFOLIATION PROCESS

FIELD OF THE INVENTION

This invention relates to graphite and more particularly to a method of modifying graphite and creating novel graphite composites.

BACKGROUND OF THE INVENTION

Graphites are made up of layered planes of hexagonal arrays or networks of carbon atoms. These layered planes of hexagonally arranged carbon atoms are substantially flat, covalently bonded in the flat layered planes, and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size; the crystallites being highly aligned or oriented with respect to each other and having well ordered carbon layers. In other words, highly ordered graphites have a high degree of preferred crystallite orientation. It should be noted that graphites possess transversely isotropic structures and flexible graphite produced thus exhibit or possess many anisotropic properties that are highly directional, e.g., thermal and electrical conductivity and fluid diffusion. Briefly, graphites may be characterized as laminated structures of carbon that are structures consisting of superposed layers or laminae of carbon atoms joined together by weak van der Waals forces. In considering the graphite structure, two axes or directions are usually noted, to wit, the "c" axis or direction and the "a" axes or direction. For simplicity, the "c" axis or direction may be considered as the direction perpendicular to the carbon layers. The "a" axes or direction may be considered as the directions parallel to the carbon layers or the direction perpendicular to the "c" direction. The natural graphites suitable for manufacturing flexible graphite possess a very high degree of orientation.

As noted above, the bonding forces holding the parallel layers of carbon atoms together are weak van der Waals forces as compared to the covalent bonds in the layered planes. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

With respect to the above treating of natural graphite, such as natural graphite flake, with an intercalant, e.g., a solution of sulfuric and nitric acid, the crystal structure of the graphite reacts to form a compound of graphite and the intercalant. The treated particles of graphite may be hereafter referred to as "particles of intercalated graphite". Upon exposure to high temperature, the particles of intercalated graphite expand in dimension as much as 80 or more times its original volume in an accordion-like fashion in the "c" direction, i.e., in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes and provided with small transverse openings by deforming mechanical impact.

A common method for manufacturing graphite sheet, e.g., foil from flexible graphite, is described by Shane, et al. in U.S. Pat. No. 3,404,061 the disclosure of which is incorporated herein by reference. As shown in FIG. 1, in the typical practice of the Shane, et al. method, natural graphite flakes 12 are intercalated 14 by dispersing the flakes in a solution containing a mixture of nitric and sulfuric acid. The intercalation solution may contain acidic compounds and other intercalating agents known in the art. Examples of acidic compounds include solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g., trifluoroacetic acid.

After the flakes are intercalated, any excess solution is drained from the flakes and the flakes are water-washed. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. Upon exposure 16 to high temperature, e.g., 700° C. to 1000° C., the particles of intercalated graphite expand as much as 80 to 1000 times its original volume in an accordion-like fashion in the c-direction, i.e., in the direction perpendicular to the crystalline planes of the constituent graphite particles. As previously stated, the expanded graphite 18 is vermiform in appearance, and is therefore commonly referred to as worms. The worms may be compressed together into flexible sheets which, unlike the original graphite flakes, can be formed and cut into various shapes and provided with small transverse openings by deforming mechanical impact as hereinafter described.

A drawback of the above intercalation process is that it requires significant remediation of effluents generated during the process. The process produces various species of sulfuric and nitrous compounds in both liquid and gas phases that require remediation. There is a need to develop an intercalation process that will reduce, preferably eliminate, the production of the environmentally unfriendly sulfuric and/or nitric species and likewise reduce, preferably eliminate, the use of chemical compounds to treat the environmentally unfriendly sulfuric and/or nitric species.

Another drawback of the intercalation and exfoliation process is that the above process cannot be used to control the amount of exfoliation or to produce nano-particle sized graphite flakes. Consequently, the expanded graphite flake produced from the process will have a thickness of at least 10 microns or greater, typically at least 50 microns or more. Therefore, a need also exists to be able to control the amount of exfoliation and to be able to produce nano-sized particles of graphite.

SUMMARY OF THE INVENTION

A first aspect of the invention includes a method of modifying graphite. The method includes the step of introducing an intercalant into at least one flake of natural graphite. The method further includes introducing a fluid into at least one of a plurality of interstices of the flake.

Preferably the fluid comprises at least one of a sub-critical point fluid, a near critical point fluid, or a supercritical fluid.

Another aspect of the invention includes a method of making at least one nano-sized flexible graphite particle. The steps of the method include intercalating at least one flake of natural graphite with an intercalant and, optionally, an oxidizing agent, and introducing a fluid into at least one of a plurality of interstices of the flake. Preferably, the fluid comprises at least one of a sub-critical point fluid, a near critical point fluid, or a supercritical fluid.

A further aspect of the invention is a method of making a graphite composite. The method of making the graphite composite includes the step of intercalating at least one flake of natural graphite with an intercalant and with or without an oxidizing agent. The method also includes the step of introducing a fluid into at least one of a plurality of interstices of the flake. Preferably, the fluid comprises at least one of a sub-critical point fluid, a near critical point fluid, or a supercritical fluid. The method further includes exfoliating the graphite flake; thereby forming expanded graphite, and blending an effective amount of the expanded graphite with a polymeric material, whereby forming the graphite-polymeric composite.

Furthermore, the aspects of the invention include a graphite-polymer composite. One composite includes a polymeric material and an effective amount of a plurality of graphite particles such that a loading rate of the graphite particles in the composite comprises less than about 20%. Preferably at least one of the graphite particles has a surface area of at least about 100 m²/g or an aspect ratio of at least about 100,000:1.

One advantage of the invention is that the aforementioned methods may be used to manufacture graphite in a form that has a thickness of less than about 10 microns, preferably less than about 1 micron, more preferably less than about 100 nm, even more preferably less than about 10 nm, and most preferably less than about 1 nm. Also, the inventive methods may be used to increase the volume expansion of the graphite particle during processing as compared to the volume expansion resulting from the conventional intercalation-exfoliation process. The inventive methods may result in a volume expansion of an individual graphite particle of more than about 1000 times. It is believed that the volume expansion of a particle processed by the inventive methods is at least about a ten (10) fold increase as compared to the volume expansion of a particle treated with the conventional process.

Another advantage of the invention is that it includes a new method to process natural graphite into new forms of powdered graphite that have applications in supercapacitors, batteries, catalyst supports, and polymeric/graphitic composites.

Practicing the invention will result in the advantage of reducing, preferably eliminating, the production of the environmentally unfriendly sulfuric and/or nitric species during the intercalation process. Likewise practicing the invention may result in the advantage of reducing, preferably eliminating, the use of chemical compounds to treat the environmentally unfriendly sulfuric and/or nitric species produced during the intercalation process.

Another advantage of the invention, is that an aspect of the invention may be practiced to produce an exfoliated graphite flake that does not require the aforementioned heating of the intercalated graphite to a temperature of 700° C. to 1200° C. A further advantage of the invention is the invention may be practiced to produce a flexible graphite article that is substantially free of the aforementioned sulfuric species and/or nitric species. Furthermore, the advantages of the invention include that the invention enabled the use of an entirely new class of chemical compounds as intercalates than what was previously unavailable as an intercalant.

Additionally, practicing the invention will result in the advantage of being able to produce expanded graphite without having to practice traditional intercalation processes. The advantages of the invention also include the ability to recycle the fluid, resulting in the benefits of reducing the need for pollution abatement and reducing material costs.

A further advantage of the invention is that the invention may be practiced to separate adjacent graphene layers that do not have defects between the adjacent layers, or defects within the crystalline layer. Defects is used herein to describe irregularities in the structure of the graphite flake such as crystalline dislocations, atomic vacancies, fracture planes, polycrystalline grain boundaries, or other crystalline structure non-uniformities, as well as, impurities between the graphene layers, such as the presence of silicon, magnesium, potassium, sodium, aluminum, iron, or phosphorus elements in between the graphene layers.

Furthermore, the advantages of the invention include the ability to control the separation of the spacing between the respective graphene layers of the graphite flake through the inventive intercalation and exfoliation processes. These processes may be used to produce a nano-sized graphite particle. Nano-sized graphite particles have advantageous applications in the area of electrically conductive polymer composites, thermally conductive polymer composites, supercapacitors, catalyst and/or metal supports, batteries, and microelectronics. The nano-sized graphite particles can be added to polymeric materials to produce composites with improved electrical properties, mechanical strength properties, coefficient of thermal expansion, and/or barrier performance.

The advantages of the invention also include that the inventive methods may be used to process graphite flake that has one dimension of about 50 microns or less, even graphite flake that has one dimension of about 10 microns or less.

Additional features and advantages of the invention will be set forth in the detailed description which follows, the claims, as well as the appended drawings. It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention

BRIEF DESCRIPTION OF THE DRAWINGS

FIG. 1 is schematic diagram of an embodiment to make graphite in accordance with the conventional intercalation and exfoliation process.

FIG. 2 is a schematic diagram of an embodiment to make graphite in accordance with the invention.

FIG. 3 is an exploded schematic representation of the introduction of a supercritical fluid into the interstitial galleries of a piece of natural graphite flake in accordance with the invention.

FIG. 4 is a block diagram of two different stages of intercalation.

FIG. 5 is a phase diagram for a fluid in arbitrary terms and showing conditions for introducing the intercalant and the exfoliating the graphite in accordance with one embodiment of the invention.

DETAILED DESCRIPTION OF THE INVENTION

The invention will be further described in regards to the accompanying drawings. Whenever possible, like or the same reference numerals may be used to describe like or the same elements. Illustrated in FIG. 2 is a schematic diagram of one embodiment of a method to modify graphite in accordance with the invention, generally designated 20.

The method includes a step 24 of intercalating at least one flake of natural graphite 22 with an intercalant and optionally an oxidizing agent. In one embodiment, the natural graphite flakes are intercalated by dispersing the flakes in a solution containing a mixture of nitric acid (oxidizing agent) and sulfuric acid (intercalant). The intercalation solution may contain other acidic compounds and intercalating agents instead of or in addition to sulfuric acid. Examples of other acidic compounds include solutions containing organic acids, e.g., acetic acid, nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g., trifluoroacetic acid. Optionally, the oxidizing agent may comprise nitric acid, ozone oxygen, hydrogen peroxide, bisulfate salts, carbonates, hexafluorophosphates, tetrafluoroborates, perchloarates, and combinations thereof.

In an alternate embodiment, an electrolytic oxidation may be used in place of, or along with, the oxidizing agent. For further description regarding the use of an electrolytic oxidation the specification of U.S. Pat. No. 6,406,612 is incorporated herein by reference.

Preferred embodiments of the intercalating agent comprise a solution of a mixture of sulfuric acid, or sulfuric acid and phosphoric acid, and another component, i.e., nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine in a solution of bromine and sulfuric acid or bromine in an organic solvent.

Preferably, the intercalation comprises stage 5 or lower. Stage 5 or lower is used herein to mean any one of stages 1–5 of intercalation. Therefore, the preferred stage of intercalation will bring about some degree of separation between about every fifth layer of graphene to about between each adjacent layer of graphene.

What is meant by a stage of intercalation is further illustrated in FIG. 4, generally designated 50. FIG. 4 illustrates the intercalation of a piece of natural graphite flake 52 to either stage 3 or stage 1 intercalation. As shown in stage 3 intercalation 54, intercalant 60 is inserted between every third graphene layer 58. With respect to stage 1 intercalation 56, intercalant 60 is inserted between each pair of adjacent graphene layers 58.

Step 24, of FIG. 2, also includes introducing a fluid into at least one of a plurality of interstices of the flake. A fluid is used herein to define a compound that may be either a liquid, a gas, or a substance near or above its critical point. Preferably the fluid comprises at least one of a sub-critical point fluid, a near critical point fluid or a supercritical fluid. A sub-critical point fluid has at least one of a temperature or a pressure that is less than a critical point for the fluid, preferably both. With respect to FIG. 5, at least one of a temperature or a pressure comprises less than the respective values associated with critical point 74, preferably both the temperature and the pressure.

A near critical point fluid is a fluid that has temperature that comprises at least the temperature of the triple point for the particular fluid and a pressure that comprises at least the pressure associated with the triple point for the fluid. However, in the combination of the pressure and temperature, at least one of the pressure or the temperature is no more than about the critical point of the fluid. With respect to FIG. 5, at least one of the pressure or temperature is up to at least point 72 for the triple point and no more than about point 74 for the critical point.

A supercritical fluid may be commonly known as a liquid with the properties of a gas or vice versa. The properties of a supercritical fluid are a combination of the properties while the fluid is in the gas state and the liquid state. In other words, some of the properties of the fluid will correspond to the fluid in the liquid state, while others will correspond to the fluid in the gas state. With respect to FIG. 5, the temperature and pressure of the fluid comprise at least a temperature or pressure associated with the critical point 74 or greater.

Preferred types of fluids are water, helium, and carbon dioxide. The critical point (also referred to as the supercritical point) of water comprises a temperature of at least about 374° C. and a pressure of at least about 22.1 MegaPascals. At or about the critical point, the density and viscosity of water decreases, increasing the diffusivity of the water molecules and the mobility of other chemical species dissolved in the water. Consequently, an improvement in mass transfer is achieved.

Also, the acid product changes and the dielectric environment and the oxidizing power of the medium are intensified. All of these properties contribute to making supercritical water an excellent reaction medium. The dielectric constant of supercritical water decreases from 78 to 5. The aforementioned dielectric constant is a typical value for polar constants, thus making the water a good solvent for gases and organic compounds. In light of the above changes in property, supercritical water has demonstrated great ease in penetrating a porous structure. The critical point of carbon dioxide comprises a temperature of at least about 31° C. and a pressure of at least about 7.4 MegaPascals. Supercritical carbon dioxide has exhibited a similar behavior as super critical water and has also demonstrated great ease in penetrating a porous structure. In addition to supercritical water and supercritical carbon dioxide, other suitable supercritical fluids include supercritical helium and supercritical water oxidation. Supercritical water oxidation is commonly referred as water with a high oxygen content. The critical point of supercritical water oxidation is about 500° C. and about 700 bar pressure.

It is preferred that the intercalant and oxidizing agent is soluble in the fluid, but, the properties of the intercalant and oxidizing agent may be tailored to a multistep processes. Multistep process is used herein to describe at least when intercalation and exfoliation do not have the same temperature and pressure conditions, such as shown in FIG. 5. Any combination of intercalation-exfoliation temperatures and pressures may be used in practicing the invention. For example, the introducing of the intercalant may occur at a temperature and pressure in the sub-critical point range. The temperature and pressure may be subsequently changed to above the critical point and the flake exfoliated.

Two examples of how the fluid may be introduced into the flake are cited below. The examples are meant only to be demonstrative and not meant to limit the invention. In one example, the fluid is introduced into a vessel containing the flake. The vessel is then heated and pressurized to about near critical conditions of supercritical conditions. Then the intercalant and oxidizing agent are added to the vessel. In a second example, the flake is introduced into a vessel, already substantially at or near the supercritical conditions, containing the fluid. After the flake is introduced into the vessel, the intercalant and oxidizing agent may be charged into the vessel.

An advantage of intercalating the natural graphite and introducing the fluid into the graphite is that the fluid is introduced into non-defect areas of the interstices of the graphite. This means that the fluid can be located between graphite layers that do not include the aforementioned compositional or structural defects between the graphene layers.

With respect to the timing of the introducing steps of the intercalant and the fluid, optionally, the two steps may be started at substantially the same time. Alternatively, the introducing of the fluid step may be started after introducing the intercalant step has been started. In a third embodiment, the introducing of the fluid step may be started after the introducing of the intercalant has been substantially completed. In a fourth embodiment, introducing the fluid step may be initiated prior to introducing the intercalant step.

An example of the introduction of the fluid into the graphite flake is depicted in FIG. 3. FIG. 3 is an exploded schematic representation of the introduction of a supercritical fluid into the interstitial galleries of a piece of natural graphite flake in accordance with the invention, generally designated 40. Depicted in FIG. 3 are a plurality of layered planes of carbon atoms 42 which make up a graphite flake 41. Flake 41 includes a carbon atom at each junction 43 where two lines meet. The interstitial galleries of flake 41 are represented by the area between layered planes 42 in the c direction of flake 41. Further illustrated in FIG. 3, is the introduction of a fluid 46 into the interstitial galleries (interstices) 48 of graphite flake 41 through the use of an introduction element 44.

With respect to function, the use of the intercalant and the oxidizing agent does not achieve the same end result as the fluid. The oxidizing agent, if used, and the intercalant substantially react in concert to open up the graphene layers of the graphite flake. The fluid penetrates the interstitial galleries of the flake. A main function of the fluid is not to substantially react with the flake, but to substantially expand the distance between the graphene layers during subsequent exfoliation.

One difference between the invention and the conventional process can be seen in comparing FIGS. 1 and 2. In FIG. 1, graphite 12 is intercalated 14 and exfoliated 16 to arrive at expanded graphite 18. As shown in FIG. 2, graphite 22, which is intercalated 24 with the fluid and exfoliated 26, has a greater capacity to expand. As depicted in FIG. 2, graphite 22 may be expanded into individual graphene layers 28 with the inventive process.

Back to introducing the intercalant step, the temperature of the intercalation step may comprise a temperature associated with a sub-critical point and up to or above a temperature associated with the supercritical point (also referred to as the critical point) of the fluid and anywhere in between. The pressure of the intercalation step may comprise at least a pressure associated with a sub-critical point fluid and up to or above a pressure associated with a supercritical point of the fluid and anywhere in between. Any combination of temperature and pressure conditions can be used for the step of introducing the intercalant. As shown in FIG. 5, preferred intercalation temperature and pressure conditions can include intercalating the flake under near critical point conditions, e.g., about triple point to about the supercritical point, between points 72 and 74.

Optionally, the inventive method may further comprise step 26 of exfoliating the graphite. Preferably, exfoliation will result in further separation of the graphene layers 28. In one embodiment, the exfoliation step comprises heating the flake to at least about 700° C. and preferably, no more than about 1200° C. An additional embodiment of exfoliation step 26 comprises the introducing step occurring in a pressurized vessel having an internal pressure of greater than atmospheric pressure and the exfoliating step comprises reducing the internal pressure of the vessel. Preferably, the pressure in the vessel is reduced to atmospheric pressure. Furthermore, exfoliating step 26 may comprise reducing the pressure in the vessel by discharging the flake with the fluid from the vessel. Spraying the flake from the vessel is one technique that may be used to discharge the flake from the vessel. Optionally, the flake may be sprayed onto a substrate, into a second vessel, or recycled into the same vessel.

In another embodiment of exfoliating step 26, it is preferred, that step 26 comprises exfoliating the flake at a maximum temperature of the flake of less than about 700° C., more preferably the flake does not achieve a temperature associated with a supercritical point of the fluid. Preferably, this embodiment of exfoliating step 26 does not include heating the flake to a temperature above the present operating conditions of the aforementioned method. In a further embodiment, exfoliating step 26 comprises increasing the volume of the fluid in the interstices of the flake. Preferably, the volume of the fluid is increased rapidly, such that the expansion of the fluid in the interstices functions similarly to a fluid boiling inside the interstices and results in further separation of the layers of graphene adjacent the fluid.

As shown in FIG. 5, one preferred embodiment of exfoliation step 26 is to exfoliate the flake at temperature and pressure conditions that are at or above the supercritical point of the fluid. This is a temperature and pressure at point 74 of FIG. 5 or higher. Preferably, the steps of introducing the intercalant and the fluid 24, and exfoliating 26 all occur in the same reactor. It is also preferred that exfoliation is accomplished in a single pass. Meaning that the exfoliated particles do not have to be collected and be processed through more than one exfoliation step. In one embodiment the steps of introducing the intercalant and the fluid 24 and exfoliation 26 occur substantially simultaneously. One technique to accomplish this is that all three steps occur at the end of a spraying apparatus. This technique may further include recirculating the flake or the fluid into another vessel or the same vessel.

The inventive method may also include a recycling step of the fluid for use in subsequent introducing steps. Preferably, the recycling step comprises collecting the fluid after exfoliation and using the collected fluid with non-collected fluid for a subsequent introducing step. Optionally, recycling may include storing the collected fluid. The method may also include washing the flake with water, preferably before the exfoliation step.

The invention further includes another method of forming the inventive graphite. The method includes the step of increasing the length of at least one interstice between at least two adjacent layers of at least one flake of natural graphite through an oxidation-reduction process. The method further includes introducing the fluid into the at least one interstice of the flake and expanding a volume of the fluid in the interstice.

The aforementioned inventive methods may be used to form nano-sized expanded graphite particles. A nano-sized particle has at least one dimension that is less than about 1 micron. Preferably, the nano-sized particle has at least one dimension of less than about 100 nm, more preferably less than about 50 nm. In preferred embodiments of the nano-sized particle graphite, preferably the thickness of the particle is less than about 10 nm, more preferably less than about 5 nm, even more preferably less than about 1 nm, and most preferably less than about 0.5 nm. For example, the particle may comprise a single graphene layer. It is also preferred that the graphite particle has a surface area of at least about 100 $m^2/g$, more preferably at least about 500 $m^2/g$, even more preferably at least about 1000 $m^2/g$, most preferably at least about 2000 $m^2/g$. With respect to an aspect ratio, preferred aspect ratios comprise at least about 20,000:1, preferably at least about 100,000:1, and most preferably at least about 200,000:1.

High Resolution Transmission Electron Microscopy (HR-TEM) and Scanning Electron Microscopy (SEM) can be utilized to verify the aspect ratio of graphite particles generated. Density measurements can give an indication of exfoliation characteristics, X-Ray Diffraction (XRD) can also be utilized to indicate the extent of graphene layer separation.

The exfoliated graphite may be used to manufacture various types of composites. Composites manufactured with the inventive graphite have improved mechanical strength, modulus, barrier performance, thermal expansion, electrostatic discharge (ESD) (surface/volume resistivity of about $10^5$ to about $10^{12}$ ohms/sq.), electromagnetic interference (EMI) shielding (surface to volume resistivity about 1 to about $10^5$ ohms/sq.), and electronic thermal management (ETM) properties, high electron or hole mobility flexible substrates, and a reduction in weight. In the below composites, the inventive graphite particles may be in the form of a powder. A powder is used herein in terms of ASTM B 243(95) meaning that the particle has at least one dimension of about 1000 microns or less.

One such composite is a graphite-polymer composite. The composite is manufactured by blending an effective amount of the graphite with a polymeric material, thereby forming the graphite-polymeric composite. Preferably the loading rate of the composite comprises less than about 20%. Preferably, the loading rate comprises about 15% or less, more preferably about 10% or less, even more preferably less than about 5%, and most preferably, less than about 3%. The loading rate is described herein to mean the percent by weight of the amount of graphite in the composite. Examples of suitable polymers for the composite include nylons, polyvinyl chloride, poly(methyl)methacrylates, polystyrene, polyethylenes, polypropylenes, polystyrenes, polycarbonates, epoxies, polyfluorinated hydrocarbons, e.g., perfluorinated hydrocarbons, polyimides, polyamides, fluorinated polymers, acryloides, polyacrylics, polyesters, cyanate esters, bismal imides, hydrophobic polymers, and combinations thereof. Preferably at least one of the graphite particles in the composite has an aspect ratio of at least about 100,000:1, more preferably at least about 200,000:1. It is more preferred that a majority of the particles which make-up the composite have the aforementioned aspect ratios.

Graphite particles made in accordance with the invention may also be used in a composite to form a capacitor, preferably a double layer capacitor. Preferably, the capacitor composite comprises a plurality of expanded graphite flakes and a polymeric material. A preferred loading rate of the graphite is at least about 70%, more preferably at least about 80%, even more preferably at least about 90%, and most preferably at least about 95%. Preferably, the composite comprises at least one graphite particle having a surface area of at least about 1000 $m^2/g$. More preferably, the surface area comprises at least about 2000 $m^2/g$. It is further preferred that at least about one-fourth of the particles in the composite has the aforementioned surface area, more preferably, at least about one-half. A preferred polymeric material for the composition comprises poly(vinylidene fluoride) and related polymers, such as block copolymers which poly(vinylidene fluoride) comprises one or more of the blocks. Preferred solutions for the double layer capacitor comprise organic solutions, which comprise carbonates, e.g., acetonitrile or water based solutions with sulfuric acid or potassium hydroxide. One preferred solution is a mixture of tetraethylamonium and tetrafluoroborate. Typical voltage requirements for a double layer capacitor comprise at least about 1 volt, more preferably at least about 2 volts. It is also preferred if the double layer capacitor has a useable energy density of about 1 Wh/kg and a power pulse density of at least about 1 kW/kg. For additional description regarding capacitors the specification of U.S. patent application Ser. No. 10/022,596 filed on or about Dec. 31, 2001 is incorporated herein by reference in its entirety.

Graphite particles made in accordance with the invention may also be used in a paint composite. Preferably, an effective amount of the exfoliated graphite particles are blended with a paint to form a composite, wherein the paint composite has sufficient electrical conductivity and viscosity for use in a spray paint booth.

The inventive graphite may also be used to form a pollution abatement catalyst support composite. The catalyst support composite may be formed by blending an effective amount of the exfoliated graphite with a hydrophobic polymer to form the composite. In one embodiment of the composite, carbon black is blended into the composite. Optionally, a metal may be deposited onto a surface of the composite. A preferred technique for depositing the metal is electroless plating or vapor deposition. Preferred metals include iron, nickel, platinum, stainless steel and titanium. The catalyst support maybe attached to a catalyst. Preferred types of catalyst include transition metals which includes binary and tertiary alloys of such transition metals. Preferred metals include platinum, osmium, ruthenium, and combinations thereof. The catalyst support has applications in the areas of hydrogenation reactions and petroleum refining.

Graphite made in accordance with the invention may also be used in a battery. The inventive graphite may be used to improve conductivity and connectivity of the internal components of the battery, which will improve the useful life of the battery. In the case of an alkaline battery, the inventive graphite particles may be attached to the cathode. In the case of a lithium ion battery, the inventive graphite particles may be attached to the anode.

The inventive graphite also has applications in the field of microelectronics in an area such as thin films. An example of a thin film is a polyimide film of about 200 microns thick. Preferably, the polyimide film further comprises an effective amount of a polymer so that the film has excellent flexibility properties for the application of the film. Preferred polymers include polyimides, polyhydrocarbons, e.g., polyethylene and polyfluorinated hydrocarbons, perfluorinated hydrocarbons. It is also preferred that the film comprises an effective amount of the inventive graphite. A factor in determining the effective amount of graphite is the desired electron or hole mobility of the film. Electron or hole mobility is herein defined as the ability to move electrons or holes (the absence of electrons) in the film. The inventive film will have applications in products such as liquid crystal display devices, transistor, memory elements, and logic elements for signal processing.

With respect to the aforementioned graphite-composites, the graphite may be blended into the polymeric material at any time during the manufacturing process. For example, the graphite may be blended into the polymeric material after exfoliation. Alternatively, the graphite may be blended into the polymeric material during prior to exfoliation. This flexibility in processing may lead to an in-situ polymerization process.

In the aforementioned composites, it is understood that the composites comprise preferably at least about one-quarter graphite particles made in accordance with the invention, more preferably at least about one-third, even more preferably at least about one-half, and most preferably substantially all.

It will be apparent to those skilled in the art that various modifications and variations can be made to the present invention without departing from the spirit and scope of the invention. Thus it is intended that the present invention cover the modifications and variations of the invention provided they come within the scope of the appended claims and their equivalents.

What is claimed is:

1. A method of modifying graphite comprising:
   introducing an intercalant into at least one interstice of at least one flake of natural graphite; and
   introducing a supercritical fluid into said at least one interstices of said flake.

2. The method according to claim 1 wherein said fluid comprises at least one of carbon dioxide, water, and helium.

3. The method according to claim 1 wherein said introducing said intercalant further Comprises introducing an oxidizing agent.

4. The method according to claim 1 further comprising heating said flake to a temperature of about 700° C. to about 1200° C.

5. The method according to claim 1 wherein said introducing of said fluid occurred in a pressurized vessel having an internal pressure greater than atmospheric pressure and further comprising reducing said internal pressure of said vessel.

6. The method according to claim 1 further comprising exfoliating said flake at a maximum temperature of less than about 700° C.

7. The method according to claim 1 wherein said fluid in said interstices of said flake occupies a predetermined volume within said interstices, further comprising increasing said volume occupied by said fluid.

8. The method according to claim 1 wherein a temperature of said introducing of said intercalant comprises at least a temperature associated with a triple point of said fluid and no more than a temperature associated with a supercritical point of said fluid.

9. The method according to claim 1 wherein a pressure of said introducing of said intercalant comprises at least a pressure associated with a triple point of said fluid and no more than a pressure associated with a supercritical point of said fluid.

10. The method according to claim 1 wherein a temperature of said introducing of said intercalant comprises at least a temperature associated with a supercritical point of said fluid and a pressure associated with said supercritical point of said fluid.

11. The method according to claim 1 wherein said discharging comprises spraying said flake and said fluid from said vessel.

12. The method according to claim 1 further comprising exfoliating said flake and wherein said steps of introducing said intercalant, introducing said fluid, and said exfoliating occur substantially at about the same time.

13. The method according to claim 3 wherein said oxidizing agent comprises ozone.

14. The method according to claim 5 wherein said reducing said pressure comprises recirculating said flake and said fluid into said vessel.

15. The method according to claim 1 further comprising blending an effective amount of said flake with a polymeric material, thereby forming a graphite-polymeric composite having a loading rate of less than about 20%.

16. The method according to claim 1 wherein said intercalating step comprises no more than about stage 5.

17. The method according to claim 1 further comprising washing said graphite.

18. A method of making at least one nano-sized flexible graphite particle comprising:
    introducing into at least one flake of natural graphite an intercalant; and
    introducing a supercritical fluid into at least one of a plurality of interstices of said flake.

19. The method according to claim 18 wherein said fluid comprises at least one of supercritical water oxidation, supercritical carbon dioxide, supercritical helium, and supercritical water.

20. The method according to claim 18 further comprising heating said flake to a temperature of about 700° C. to about 1200° C.

21. The method according to claim 18 wherein said introducing of said fluid occurred in a pressurized vessel having an internal pressure of greater than atmospheric pressure and further comprising reducing said internal pressure of said vessel.

22. The method according to claim 18 further comprising exfoliating said flake at a maximum temperature of less than about 700° C.

23. The method according to claim 18 wherein said fluid in said interstices of said flake occupies a predetermined volume within said interstices, further comprising increasing said volume occupied by said fluid.

24. The method according to claim 18 wherein a temperature of said introducing of said intercalant comprises at least a temperature associated with a triple point of said fluid.

25. The method according claim 24 wherein a pressure of said introducing of said intercalant comprises more than atmospheric pressure and up to about a pressure associated with a triple point of said fluid.

26. The method according to claim 21 wherein said reducing said pressure comprises discharging said flake and said fluid from said vessel.

27. The method according to claim 18 further comprising blending an effective amount of said flake with a polymeric material, thereby forming a graphite-polymeric composite having a loading rate of less than about 20%.

28. The method according to claim 1 further comprising blending an effective amount of said flake with a polymeric material, thereby forming a graphite-polymeric composite having a loading rate of at least about 70%.

29. The method according to claim 18 further comprising blending an effective amount of said flake with a polymeric material, thereby forming a graphite-polymeric composite having a loading rate of at least about 70%.

* * * * *